(12) United States Patent
Xi

(10) Patent No.: US 10,440,308 B2
(45) Date of Patent: Oct. 8, 2019

(54) DYNAMIC DISPLAY PROJECTION LAMP WITH MULTIPLE PROJECTION UNITS

(71) Applicant: Guangdong YUHAO Electronics Co., Ltd., Dongguan (CN)

(72) Inventor: Jun Xi, Dongguan (CN)

(73) Assignee: GUANGDONG YUHAO ELECTRONICS CO., LTD., Dongguan (CN)

(*) Notice: Subject to any disclaimer, the term of this patent is extended or adjusted under 35 U.S.C. 154(b) by 0 days.

(21) Appl. No.: 15/927,558

(22) Filed: Mar. 21, 2018

(65) Prior Publication Data

US 2019/0132544 A1 May 2, 2019

(30) Foreign Application Priority Data

Oct. 26, 2017 (CN) .................... 2017 2 1394460 U
Jan. 16, 2018 (CN) ......................... 2018 1 0041365

(51) Int. Cl.
| | |
|---|---|
| H04N 5/74 | (2006.01) |
| H04N 9/31 | (2006.01) |
| F21V 14/06 | (2006.01) |
| F21S 8/00 | (2006.01) |
| G03B 21/20 | (2006.01) |

(52) U.S. Cl.
CPC ............ *H04N 5/7416* (2013.01); *F21S 8/032* (2013.01); *F21V 14/06* (2013.01); *G03B 21/20* (2013.01); *H04N 9/3105* (2013.01)

(58) Field of Classification Search
CPC ...... G03B 21/005; G03B 21/20; G03B 21/43; G03B 21/145; G03B 21/321; G03B 21/326; G03B 21/2006; G03B 21/2013; G03B 21/2033; H04N 5/2252; H04N 5/2256; H04N 5/2257; H04N 5/7416
See application file for complete search history.

(56) References Cited

U.S. PATENT DOCUMENTS

| | | | |
|---|---|---|---|
| 9,197,865 B2* | 11/2015 | Chien .................. | H04N 5/2354 |
| 2005/0134527 A1* | 6/2005 | Ouderkirk ............ | A61C 19/004 |
| | | | 345/32 |
| 2017/0082254 A1 | 3/2017 | Zhang | |
| 2017/0219176 A1 | 8/2017 | Chang et al. | |

* cited by examiner

*Primary Examiner* — Sultan Chowdhury
(74) *Attorney, Agent, or Firm* — Hemisphere Law, PLLC; Zhigang Ma

(57) ABSTRACT

A dynamic display projection lamp of the present invention includes plural projection units fixed to a fixing assembly. The fixing assembly includes a lens holder and a film holder for fixing a film. A plurality of penetrating holes are defined in the lens holder, and clamping grooves for clamping plural lenses of plural lens groups are formed in inner walls defining the penetrating holes. The film holder is fixed in the lens holder or at least a portion of the film holder is inserted between the lenses through an opening of the lens holder. All the projection units disposed in a single row or two rows up and down are fixed by using the lens holder and the film holder. The projection units are allowed to project patterns in sequence by using a controller, thus producing a dynamic pattern projection effect.

16 Claims, 7 Drawing Sheets

DYNAMIC DISPLAY PROJECTION LAMP WITH MULTIPLE PROJECTION UNITS

BACKGROUND OF THE INVENTION

1. Field of the Invention

The present application relates to projection lamps, and more particularly, to an dynamic display projection lamp.

2. Description of Related Art

At present, several types of projection pattern lamps are available on the market. One type is static projection, with the projected images being static and just for display as pictures. Another type is dynamic projection. One of dynamic projection techniques involves the use of a motor that drive patterns to rotate to achieve dynamic projection, which is in a form similar to a marquee with the patterns moving as a whole in accordance with a specific trajectory. Another dynamic projection technique is similar to an old-fashioned film player that may achieve projection by driving filmstrips to move rapidly and produce an animation effect with persistence of vision of the human eyes. However, such a film player is complex in structure, high in price and thus not applicable to ordinary consumer electronics.

BRIEF DESCRIPTION OF THE SEVERAL VIEWS OF THE DRAWING(S)

The foregoing and other exemplary purposes, aspects and advantages of the present invention will be better understood in principle from the following detailed description of one or more exemplary embodiments of the invention with reference to the drawings, in which.

DETAILED DESCRIPTION OF THE INVENTION

The invention will now be described in detail through several embodiments with reference to the accompanying drawings.

Figure 1:
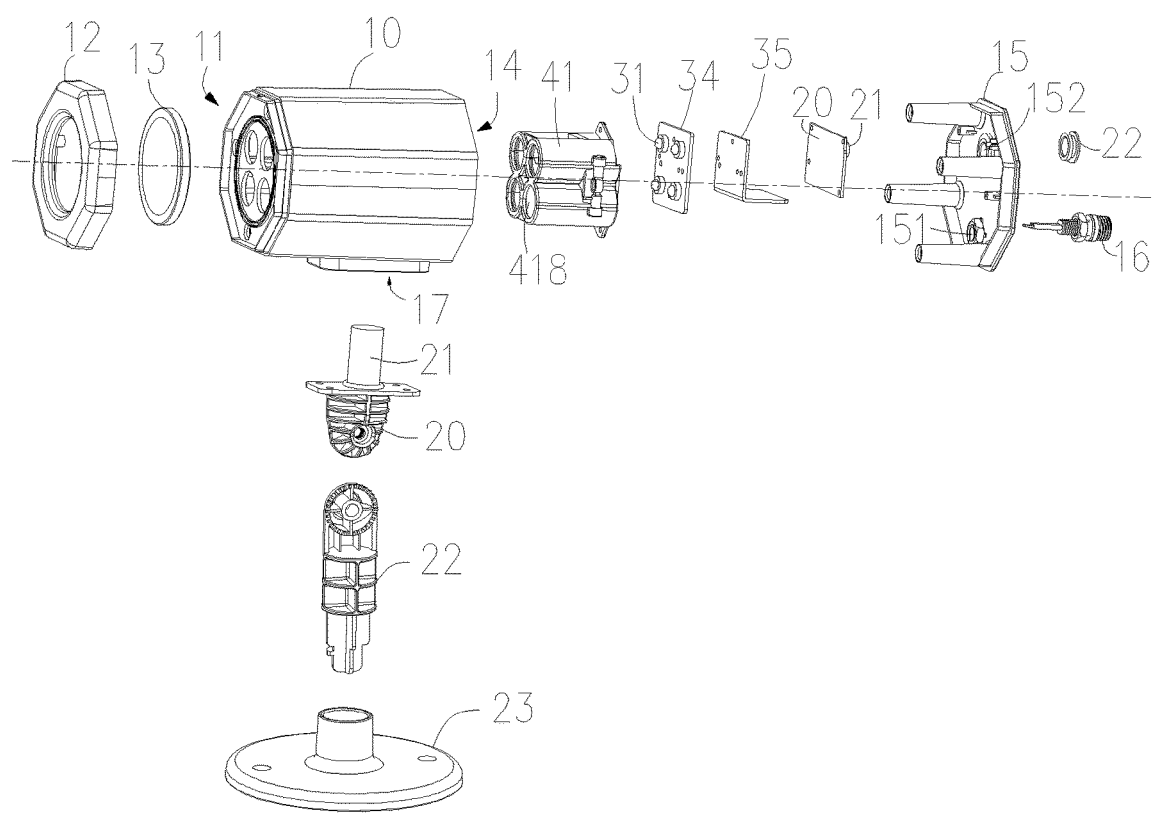
FIG. 1 is an exploded view of a dynamic display projection lamp in accordance with a first embodiment of the present invention.
Figure 2A:
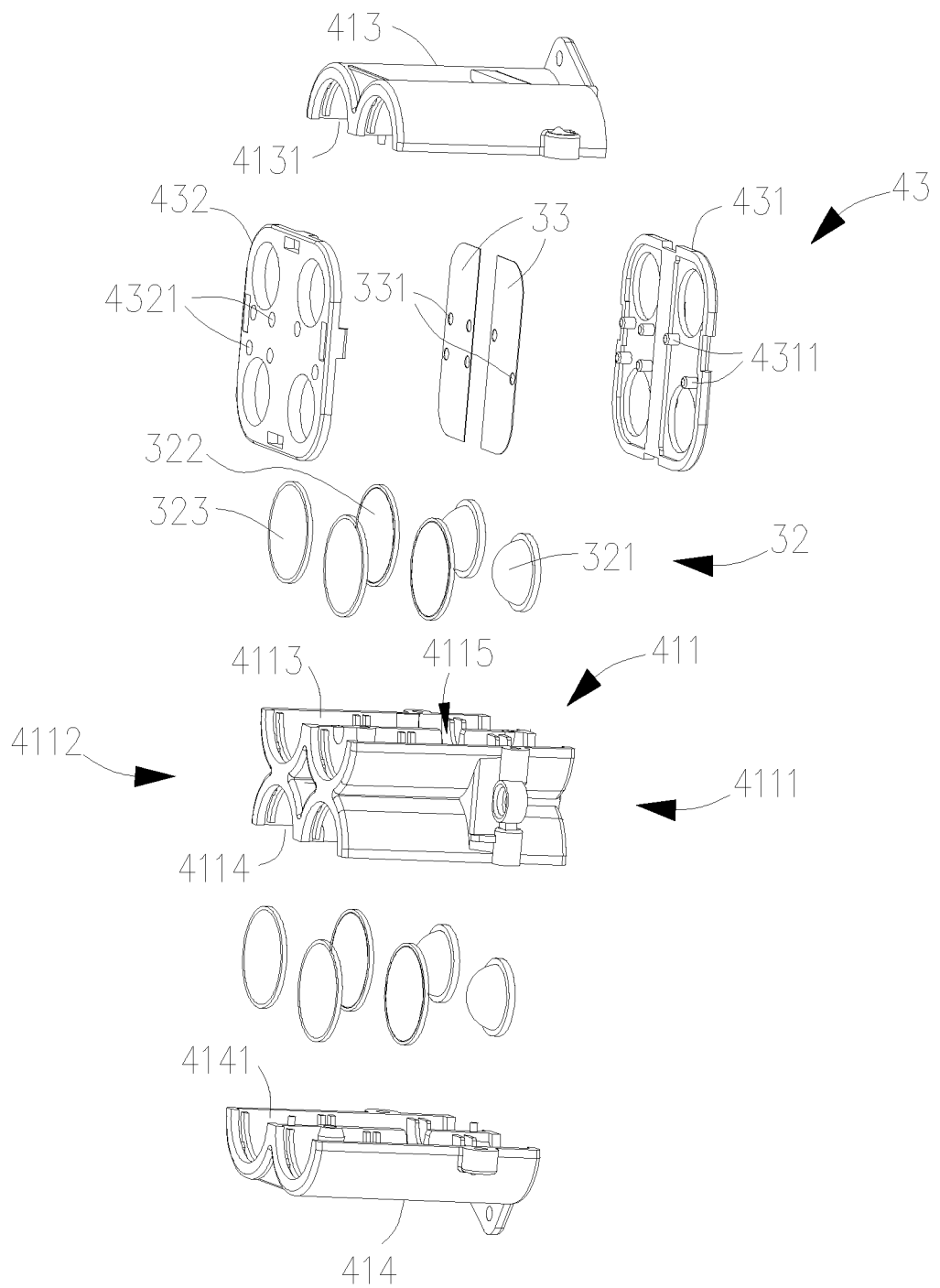
FIG. 2A is a partial exploded view of the dynamic display projection lamp in FIG. 1.
Figure 2B:
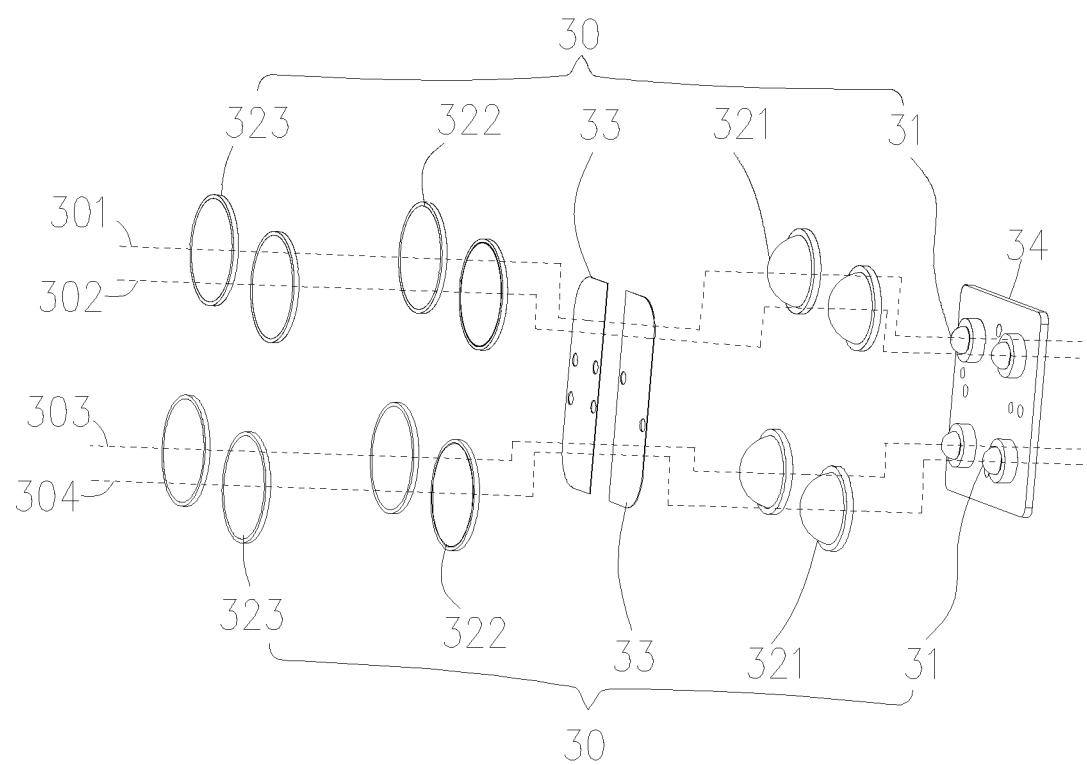
FIG. 2B is a perspective view of four projection units in FIG. 1.
Figure 3:
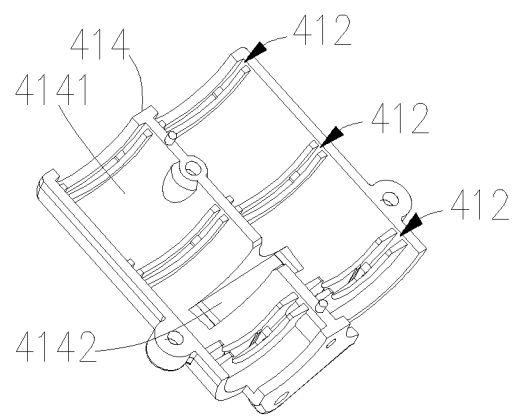
FIG. 3 is a perspective view of a lower shell of a fixing assembly in FIG. 2.

As shown in FIG. 1 to FIG. 3, in a first embodiment of the present invention, a housing 10 of a dynamic display projection lamp is substantially tubular and defines a front opening 11 used as a light exit. An annular front cover 12 is fixed at an edge defining the front opening 11. A transparent optical slice 13 is clamped between the annular front cover 12 and the front opening 11 to seal the front opening 11. A rear opening 14 is defined at the other end of the housing 10 that is opposite to the front opening 11, and a rear cover 15 is fixed at an edge defining the rear opening 14.

The rear cover 15 defines a hole 151 allowing insertion of a power supply socket 16 or coupling of a power cord therein and a key hole 152. A circuit board 20 is fixed to an inner wall of the rear cover 15. A controller is disposed on the circuit board 20 and has a key 21 of which a silicone key cap 22 extends out of the projection lamp via the key hole 152, so that a user can perform operations such as turning on, turning off and function switching on the projection lamp by using the key cap 22.

Additionally, a through hole 17 is defined in a sidewall of the housing 10, allowing a heat-conducting column 21 of a radiator 20 to be inserted therein. A tail end of the radiator 20 is rotatably connected to a base connecting rod 22 and the bottom of the base connecting rod 22 is connected to a base 23. Thus, the dynamic display projection lamp can be fixed in an angle-adjustable manner by means of the base 23 and the base connecting rod 22.

Moreover, a fixing assembly is fixed within the housing, with multiple projection units 30 being fixed on the fixing assembly. Each projection unit 30 includes at least one light source 31, a lens group 32 composed of plural lenses and disposed ahead of the at least one light source 31, and a film 33 interposed between the lenses of the lens group 32. The light source 31 may be an LED or a point light source or bulb of other type. In this embodiment, each projection unit is provided with an LED. In FIG. 2B, four projection units 30 are shown, only two projection units 30 are labeled, and dashed lines 301, 302, 303 and 304 are center axises of the four projection units 30, respectively. All LED beads are fixed on a circuit board 34. The circuit board 34 is attached on one leaf of an L-shaped heat-conducting fin 35. The other leaf of the L-shaped heat-conducting fin 35 may be in contact with the heat-conducting column 21 directly or via a thermal pad. Thus, the heat generated by the light sources can be transferred to the radiator 20 and be finally dissipated by means of the radiator part disposed outside of the housing 10, thereby ensuring normal operation of the light source.

In this embodiment, the lens group 32 of each projection unit includes three lenses: a first lens 321, a second lens 322 and a third lens 323, which are arranged in sequence in a direction from the interior of the fixing assembly to the front opening 11 of the housing 10 and all are convex lenses. In other embodiments, each lens group may be provided with two or more than three lenses according to specific needs, and each lens group may include a different number of lenses of different types.

In this embodiment, two films 33 are used, and thus every two projection units share one film 33. The film 33 is positioned between the first lens 321 and the second lens 322. In other embodiments, each projection unit may be provided with one film, or the plural projection units may share different areas of only one film. The film 33 may be made by the way of exposure, and may include a substrate made from polyethylene terephthalate (PET) and a plurality of color printed layers printed on the substrate by using the silk screen printing technique. Each color printed layer may be different in color and printed pattern, and multiple layers are stacked to form a multi-color pattern, for example, a multi-color castle or a bunch of flowers. In addition, the ink of the printed layers is uvioresistant ink. Thus, the film 32 can be resistant to high temperatures without color fading and deformation and will not have the problems of color fading and deformation even when exposed to irradiation of the LED lamp for long time. Moreover, the substrate layer is 0.8-1.5 mm (millimeter) thick and all the printed layers are 0.05-0.1 mm thick. On the film, a corresponding pattern is formed in each position corresponding to each projection unit, so that projection of the pattern can by achieved by the light emitted from the light source that passes through the lens groups and the film.

In this embodiment, the first lens 321, the second lens 322 and the third lens 323 are all convex lenses, with the first lens 321 being a hemispherical lens, the second lens 322 being a convex lens protruding toward the first lens 321 and the third lens 323 being a convex lens protruding toward the first lens 321. The three lenses and the light source 21 are positioned in such a manner that the first lens 321 is functional for focusing the light emitted from the light source 21, while the second lens 322 for magnifying the light passing through the film 33, and the third lens 322 for focusing the light passing through the second lens 322 and projecting the light onto a preset position outside of the projection lamp while ensuring a clear image.

As described above, the fixing assembly includes the circuit board 34 for fixing the light source 31 and the L-shaped heat-conducting fin 35. The fixing assembly also includes a lens holder 41 for fixing plural lens groups 32 of the plural projection units and a film holder 43 for fixing the films 33.

The lens holder 41 is fixed on fixing columns extending perpendicularly from the rear cover 15. A plurality of penetrating holes 418 corresponding to the light source 31 are formed in the lens holder 41, and clamping grooves 412 for clamping the lenses 321, 322, 323 of the corresponding lens group 32 are formed in the inner wall defining each penetrating hole 418. Moreover, a concave groove (as designed by 413 in FIG. 3) for fixing the film holder 43 or a slot (as designed by 413' in FIG. 5), which allows a portion of the film holder 43 to be inserted in the lens holder 41 from the outside and fixed, is additionally formed within the lens holder 41, so that the film 33 is positioned between the first lens 321 and the second lens 322.

In this embodiment, the film holder 43 includes a first cover 431 and a second cover 432 that can be coupled in a snap-fit manner. Cylindrical bodies 4311 extending toward the second cover 432 are provided on the first cover 431. Corresponding holes 4321 are formed in the second cover 432 and corresponding holes 331 are formed in the films 33 as well, and the cylindrical bodies 4311 of the first cover 431 pass through the holes 331 in the films 33 and then are inserted and fastened in the holes 4321 in the second cover 432. Furthermore, a convex edge and a clearance are also formed at the periphery of each of the first cover 431 and the second 432 for the purpose of limiting the films. In other embodiments, the second cover may be omitted; instead, the cylindrical bodies of the first cover may pass through the holes in the films so as to be fixed and positioned. In other embodiments, the second cover may be omitted; instead, the periphery of the first cover is bent to form a clamping groove for limiting the position of the films.

The lens holder 41 is overall in such a shape that each of four tubes is connected with other two tubes at sides, i.e., the four tubes are arranged in upper and lower rows, two tubes in each row. For the sake of facilitating assembling and replacement of the lenses and the films, the lens holder is split into three parts, which is equivalent to that halves of the two tubes in each row among the four tubes are cut off to form troughs. The lens holder 41 specifically includes a middle frame 411, and an upper cover 413 and a lower cover 414 both connected to the middle frame 411. One end of the middle frame 411 is defined as a light-entering end 4111 far away from the front opening 11 of the housing 10, and the opposite other end is defined as a light-exiting end 4112 close to the front opening 11. The upper cover 413 and the lower cover 414 are connected to the light-entering end 4111 and the light-exiting end 4112 and spaced on opposite sides by the middle frame 411. In other words, the upper cover 413 and the lower cover 414 are connected to the middle frame 411 in a direction perpendicular to the direction from the light-entering end 4111 to the light-exiting end 4112.

Two or more (two in this embodiment) concave grooves 4113 disposed in parallel and penetrating through the light-entering end 4111 and the light-exiting end 4112 are formed in the surface of the middle frame 411 that faces the upper cover 413, and two or more (two in this embodiment) concave grooves 4114 disposed in parallel and penetrating through the light-entering end 4111 and the light-exiting end 4112 are also formed in the surface thereof that faces the lower cover 414. Two or more grooves 4131, 4141 are correspondingly formed in the upper cover 413 and the lower cover 414, and the concave grooves 4113, 4114 in the middle frame are matched with the grooves 4131 of the upper cover 413 and the grooves 4141 of the lower cover 414 in a one-to-one corresponding manner, respectively, to form the penetrating holes 418.

A slot 4115 allowing the film holder 43 to pass through is additionally formed in the middle frame 411, and clamping grooves 412 for clamping a plurality of lenses of the corresponding lens group 32 are formed in the inner walls of the concave groove 4113 and 4114. Correspondingly, clamping grooves 412 for clamping a plurality of lenses of the corresponding lens group 32 and concave grooves 4142 allowing insertion of the sidewalls of the film holder 43 therein are also formed in inner sides of the upper cover 413 and the lower cover 414. The film holder 43 is positioned between the first lens and the second lens after being fixed in the lens holder, and the penetrating holes are formed in the first cover 431 and the second cover 432 in positions corresponding to the penetrating holes 418.

Particularly, in this embodiment, the dynamic display projection lamp has a central optical axis. All the penetrating holes are inclined to the central optical axis in the direction from the light-entering end 4111 to the light-exiting end 4112 so as to ensure that all the projected patterns can overlap in one position at a particular projection distance.

In the above embodiment, the connection of the middle frame 411, the upper cover 413 and the lower cover 414 is connection by screws and bolts. Snap-in connection is also possible in other embodiments.

During operating, the controller is used to control at least part of the light sources in the plurality of projection units to be turned on and off in sequence, so that the projected film movement decomposition patterns can be projected onto the same overlapping focused position. With persistence of vision of the human eyes, lighting varying decomposition patterns will be projected onto the same position to produce the animation effect, which is similar to the dynamic human figure effect of pedestrian traffic lights and thus is highly interesting and ornamental. Moreover, the mechanism is simple with low inner space requirement and low cost.

To sum up, the dynamic display projection lamp of first embodiment has the advantage of facilitating the replacement of films and lenses by using a lens holder convenient to disassemble to fix the lens groups and the films; thus, dynamic images projected by the projection lamps can be changed frequently with great interestingness. The lens holder may be made of resin or plastic material, and is simple in structure and convenient to manufacture. With the film holder, the protection for the films is strengthened and replacing of the films becomes simpler.

Figure 4:
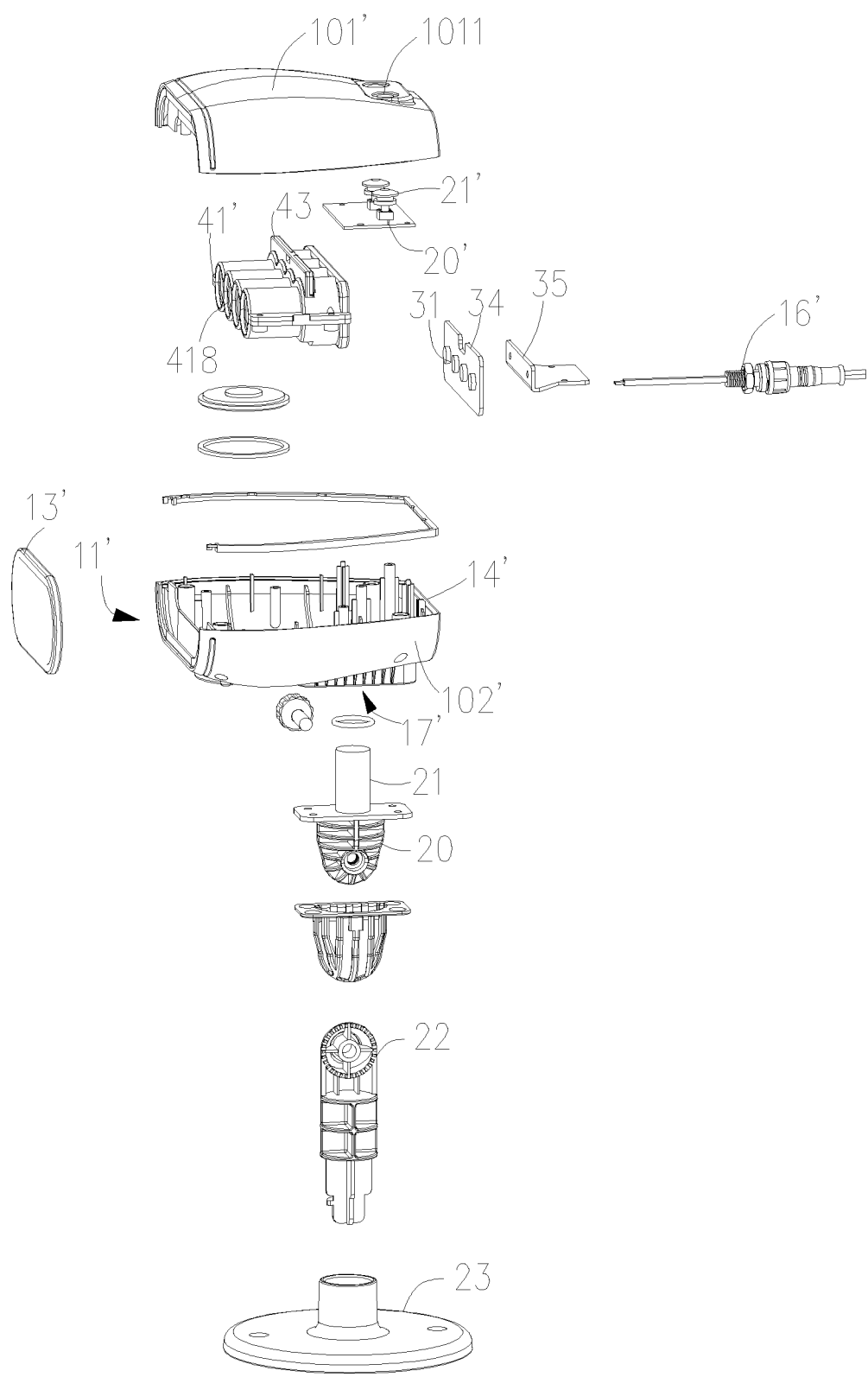
FIG. 4 is an exploded view of a dynamic display projection lamp in accordance with a second embodiment of the present invention.
Figure 5A:
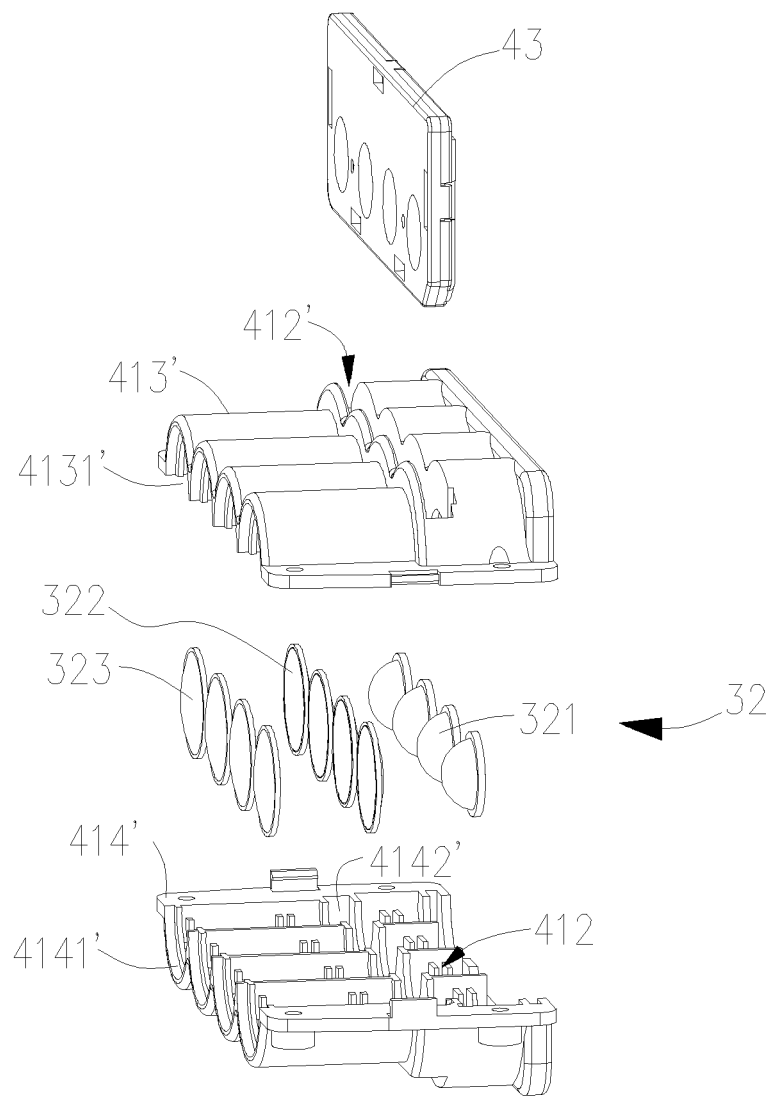
FIG. 5A is a partial exploded view of a fixing assembly of the dynamic display projection lamp in FIG. 4.

Referring to FIG. 4 and FIG. 5, in second embodiment which is a variation of first embodiment, the housing of the dynamic display projection lamp is separated by a plane parallel to the light-exiting direction into an upper housing and a lower housing 101' and a lower housing 102' that are detachably connected to each other, thereby facilitating assembling of internal components. The housing has a front opening 11' and a transparent optical slice 13' is fixed at the front opening 11'. The other end, opposite to the front opening 11', of the housing is a rear end 14', and a hole (not shown in the figure) allowing insertion of a power supply socket or coupling of a power cord 16' therein is formed in the rear end 14'. A key hole 1011 is formed in the upper housing 101'. A circuit board 20' is fixed inside of the key hole 1011. A controller is disposed on the circuit board 20' and has a key 21' of which a silicone key cap extends out of the projection lamp via the key hole 1011, so that a user can perform operations such as turning on, turning off and function switching on the projection lamp by using the key 21'. A through hole 17 is additionally formed in the lower housing 102', allowing a heat-conducting column 21 of a radiator 20 (like components are all denoted by like numerals used in first embodiment hereinafter) to be inserted therein. A tail end of the radiator 20 is rotatably connected to a base connecting rod 22 and the bottom of the base connecting rod 22 is connected to a base 23. Thus, the dynamic display projection lamp can be fixed in an angle-adjustable manner by means of the base 23 and the base connecting rod 22.

Figure 5B:
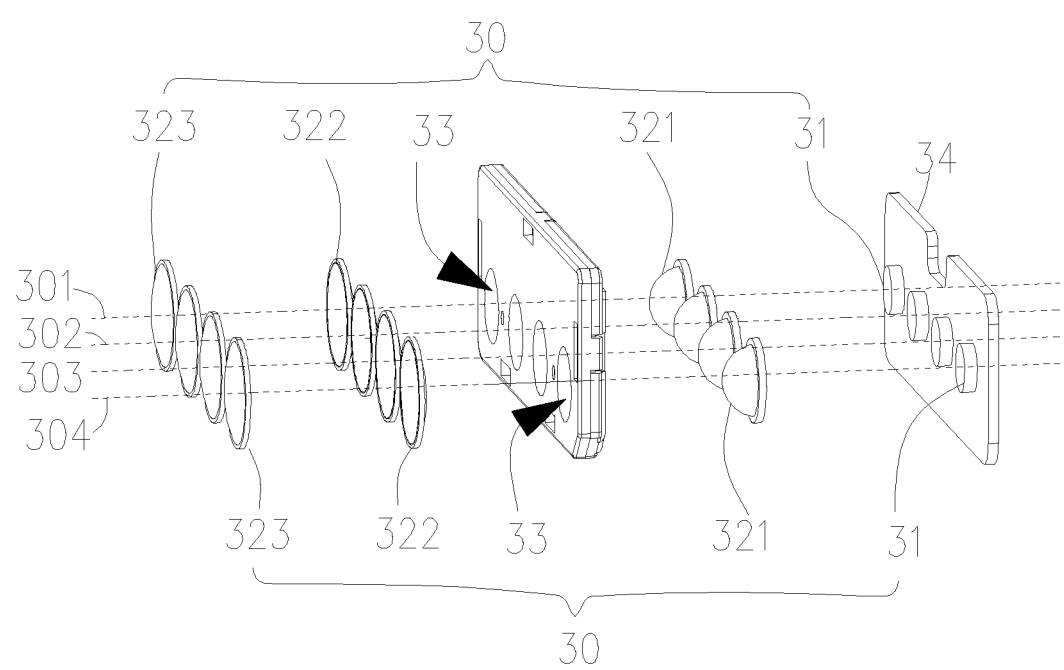
FIG. 5B is a perspective view of four projection units in FIG. 4.

Similar to first embodiment, a fixing assembly is additionally fixed within the housing, with a plurality of projection units 30 being fixed on the fixing assembly, where each projection unit 30 includes at least one light source 31, a lens group 32 composed of a plurality of lenses and disposed ahead of the at least one light source 31, and a film 33 interposed between the plurality of lenses of the lens group 32. In FIG. 5B, four projection units 30 are shown, only two projection units 30 are labeled, and dashed lines 301, 302, 303 and 304 are center axises of the four projection units 30, respectively. The light source 31 and its fixing manner, the structure and configuration of the lens group 32, the film 33 and the fastener, i. e., the film holder 34 for the film 33 are all identical and similar to those in first embodiment, which thus will not be redundantly described herein.

Similar to first embodiment, the fixing assembly may also include a lens holder 41' for fixing a plurality of lens groups 32 of a plurality of projection units in addition to the circuit board 34 for fixing the light source 31, the L-shaped heat-conducting fin 35 and the film holder 43 for fixing the films 33.

Unlike first embodiment, the lens holder 41' is fixed on a fixing column extending out of the lower housing 102'. A plurality of penetrating holes 418 opposite to the light source 31 are formed in the lens holder 41', and clamping grooves 412 for clamping a plurality of lenses of the corresponding lens group 32 are formed in the inner wall of each penetrating hole 418. Moreover, a slot 412' allowing a portion of the film holder 43 to be inserted in the lens holder 41' is additionally formed in the lens holder 41', so that the film 33 are positioned between the first lens 321 and the second lens 322.

In embodiments, a number of projection units may be provided, which are arranged in two groups in parallel up and down. In this embodiment, four projection units are provided, which are all arranged in parallel. Therefore, the lens holder 41' is overall in such a shape that four tubes are connected at sides in sequence into a row. For the sake of facilitating assembling and replacement of the lenses and the films, the lens holder is split into two parts, which is equivalent to that half of each tube is cut off to form a trough. Specifically, the lens holder 41' includes an upper cover 413' and a lower cover 414'. Four (two or three or more than four may be possible in other variations) grooves 4131', 4141' are formed in each of the upper cover 413' and the lower cover 414'. The grooves 4131' of the upper cover 413' and the grooves 4141' of the lower cover 414' are matched in a one-to-one corresponding manner to form penetrating holes 418.

Clamping grooves 412 for clamping a plurality of lenses of the corresponding lens group 32 are formed in inner sides of the upper cover 413' and the lower cover 414', and a concave groove 4142' allowing insertion of a sidewall of the film holder 43 therein is additionally formed in the lower cover 414'. A slot 412' is formed in the upper cover 413' and corresponds to the concave groove 4142'. The film holder 43 can be inserted into the lens holder from the outside of the lens holder via the slot 412', and fastened in the slot 4142' and positioned between the first lens and the second lens.

Similar to first embodiment, the dynamic display projection lamp has a central optical axis. All the penetrating holes are inclined to the central optical axis so as to ensure that all the projected patterns can overlap in one position at a particular projection distance.

In the above embodiment, the connection of the upper cover 413' and the lower cover 414' is connection by screws and bolts. Snap-in connection is also possible in other embodiments.

The dynamic display projection lamp of second embodiment is also very convenient to disassemble, and the films can be replaced more easily without dismantling the lens holder; thus, dynamic images projected by the projection lamps can be changed frequently with great interestingness. The lens holder may be made of resin or plastic material, and is simple in structure and convenient to manufacture. With the film holder, the protection for the films is strengthened and replacing of the films becomes simpler.

During operating, a control circuit is used to control various projection optical circuits to lighten the light sources in sequence, so that the projected film movement decomposition patterns can be projected onto the same overlapping focused position. With the persistence of vision of human eyes, lighting varying decomposition patterns will be projected onto the same position to produce the animation effect, which is similar to the dynamic human figure effect of pedestrian traffic lights and thus is highly interesting and ornamental. Moreover, the mechanism is simple with low inner space requirement and low cost.

While the description of the present invention is made in conjunction with the above specific embodiments, it would be obvious that those familiar with this technical field can make many alternatives, modifications, and variations. Hence, such alternatives, modifications, and variations shall all be encompassed in the spirit and scope of the appended claims.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A dynamic display projection lamp, comprising:
   a plurality of projection units, each projection unit comprising:
   at least one light source;
   a lens group composed of a plurality of lenses and disposed in front of the at least one light source; and
   a film inserted between two lenses of the plurality of lenses of the lens group;
   a fixing assembly configured for fixing the plurality of projection units; and
   a controller configured for controlling at least part of the light sources in the plurality of projection units to be turned on and off in sequence;
   wherein the fixing assembly comprises:
   a lens holder configured for fixing all the lens groups of the plurality of projection units, defining a plurality of penetrating holes each configured for receiving one of the lens groups of the plurality of projection units;
   a film holder configured for fixing the film; and
   a circuit board configured for fixing all the light sources of the plurality of projection units and configured near light-entering openings of the plurality of penetrating holes of the lens holder, so that the light sources are opposite to the plurality of penetrating holes;
   wherein a plurality of clamping grooves each configured for clamping one of the plurality of lenses of a corresponding lens group are defined in an inner wall defining each penetrating hole;
   wherein the film holder is fixed in the lens holder or at least a portion of the film holder is inserted in an opening defined in the lens holder to be located between the two lenses of the plurality of lenses of the lens group, so that the film is positioned between two lenses of the plurality of lenses.

2. The dynamic display projection lamp of claim 1, wherein at least one lens group comprises a first lens, a second lens and a third lens that are arranged in sequence in a direction from the light-entering openings to light-exiting openings of the penetrating holes.

3. The dynamic display projection lamp of claim 2, wherein the film is positioned between the first lens and the second lens.

4. The dynamic display projection lamp of claim 3, wherein the first lens, the second lens and the third lens are all convex lenses; and the three lenses and the light source are positioned in such a manner that the first lens is functional for focusing light emitted from the light source, while the second lens is functional for magnifying light passing through the film and the third lens is functional for focusing light passing through the second lens.

5. The dynamic display projection lamp of claim 3, wherein the film holder comprises a first cover and a second cover those are capable of being coupled in a snap-fit manner; the first cover comprises one or more cylindrical bodies extending toward the second cover, while the second cover defines one or more corresponding holes, and the one or more cylindrical bodies of the first cover is inserted and fastened in the one or more holes in the second cover.

6. The dynamic display projection lamp of claim 5, wherein one or more holes corresponding to the one or more cylindrical bodies of the first cover is formed in the film, and the one or more cylindrical bodies of the first cover passes through the one or more holes in the film and is fastened in the one or more holes of the second cover.

7. The dynamic display projection lamp of claim 6, wherein the lens holder comprises: a middle frame, and an upper cover and a lower cover both connected to the middle frame; one end of the middle frame is defined as a light-entering end and the opposite other end is defined as a light-exiting end; the upper cover and the lower cover are connected to the light-entering end and the light-exiting end and spaced on opposite sides by the middle frame; two or more concave grooves disposed in parallel and penetrating through the light-entering end and the light-exiting end are formed in a surface of the middle frame that faces the upper cover, and two or more concave grooves disposed in parallel and penetrating through the light-entering end and the light-exiting end are also formed in a surface of the middle frame that faces the lower cover; and two or more grooves are correspondingly formed in the upper cover and the lower cover, and the concave grooves in the middle frame are matched with the grooves of the upper cover and the grooves of the lower cover in a one-to-one corresponding manner, respectively, to form the penetrating holes.

8. The dynamic display projection lamp of claim 7, wherein a slot allowing the film holder to pass through is formed in the middle frame, and concave grooves allowing insertion of sidewalls of the film holder therein are also formed in inner sides of the upper cover and the lower cover.

9. The dynamic display projection lamp of claim 8, wherein the dynamic display projection lamp has a central optical axis, and the penetrating holes are inclined to the central optical axis in a direction from the light-entering end to the light-exiting end.

10. The dynamic display projection lamp of claim 1, wherein the lens holder comprises: a middle frame, and an upper cover and a lower cover both connected to the middle frame; one end of the middle frame is defined as a light-entering end and the opposite other end is defined as a light-exiting end; the upper cover and the lower cover are connected to the light-entering end and the light-exiting end and spaced on opposite sides by the middle frame; two or more concave grooves disposed in parallel and penetrating through the light-entering end and the light-exiting end are formed in a surface of the middle frame that faces the upper cover, and two or more concave grooves disposed in parallel and penetrating through the light-entering end and the light-exiting end are also formed in a surface of the middle frame that faces the lower cover; and two or more grooves are correspondingly formed in the upper cover and the lower cover, and the concave grooves in the middle frame are matched with the grooves of the upper cover and the grooves of the lower cover in a one-to-one corresponding manner, respectively, to form the penetrating holes.

11. The dynamic display projection lamp of claim 10, wherein a slot allowing the film holder to pass through is formed in the middle frame, and concave grooves allowing insertion of sidewalls of the film holder therein are also formed in inner sides of the upper cover and the lower cover.

12. The dynamic display projection lamp of claim 11, wherein the dynamic display projection lamp has a central optical axis, and the penetrating holes are inclined to the central optical axis in a direction from the light-entering end to the light-exiting end.

13. The dynamic display projection lamp of claim 1, wherein the lens holder comprises an upper cover and a lower cover that are coupled in a snap-fit manner; one end of the lens holder is defined as a light-entering end and the opposite other end is defined as a light-exiting end; a plurality of concave grooves disposed in parallel and penetrating through the light-entering end and the light-exiting end are formed in inner sides of the upper cover and the lower cover; and the concave grooves in the upper cover and the concave grooves in the lower cover are matched in a one-to-one corresponding manner to form the penetrating holes.

14. The dynamic display projection lamp of claim 13, wherein a slot allowing insertion of a portion of the film holder therein is formed in the upper cover, and a concave groove allowing insertion of a sidewall of the film holder therein is also formed in the inner side of the lower cover.

15. The dynamic display projection lamp of claim 6, wherein the lens holder comprises an upper cover and a lower cover that are coupled in a snap-fit manner; one end of the lens holder is defined as a light-entering end and the opposite other end is defined as a light-exiting end; a plurality of concave grooves disposed in parallel and penetrating through the light-entering end and the light-exiting end are formed in inner sides of the upper cover and the lower cover; and the concave grooves in the upper cover and the concave grooves in the lower cover are matched in a one-to-one corresponding manner to form the penetrating holes.

16. The dynamic display projection lamp of claim 15, wherein a slot allowing insertion of a portion of the film holder therein is formed in the upper cover, and a concave groove allowing insertion of a sidewall of the film holder therein is also formed in the inner side of the lower cover.

\* \* \* \* \*